United States Patent
Chen

(10) Patent No.: US 12,483,112 B2
(45) Date of Patent: Nov. 25, 2025

(54) CONTROLLER AND CONTROLLING METHOD FOR QUASI-RESONANT CONTROLLED SWITCHING CONVERTER

(71) Applicant: Monolithic Power Systems, Inc., Kirkland, WA (US)

(72) Inventor: Xuefeng Chen, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 230 days.

(21) Appl. No.: 18/489,923

(22) Filed: Oct. 19, 2023

(65) Prior Publication Data
US 2024/0171058 A1 May 23, 2024

(51) Int. Cl.
*H02M 3/335* (2006.01)
*H02M 1/00* (2006.01)

(52) U.S. Cl.
CPC ....... *H02M 1/0058* (2021.05); *H02M 1/0009* (2021.05); *H02M 3/33507* (2013.01)

(58) Field of Classification Search
CPC ............. H02M 1/0058; H02M 1/0009; H02M 3/33507; H02M 1/0025; H02M 3/33515
See application file for complete search history.

(56) References Cited

U.S. PATENT DOCUMENTS

| 10,418,912 B2* | 9/2019 | Radic | H02M 3/33592 |
| 2014/0152283 A1* | 6/2014 | Kuang | H02M 3/33523 323/283 |
| 2019/0006935 A1* | 1/2019 | Wang | H02M 3/33507 |

* cited by examiner

*Primary Examiner* — Kyle J Moody
(74) *Attorney, Agent, or Firm* — Perkins Coie LLP

(57) ABSTRACT

A controller for a quasi-resonant controlled switching converter includes a sample-and-hold circuit for providing a plateau voltage based on a voltage detection signal that represents a voltage across a power switch, a first voltage-dividing circuit for providing a first divided voltage based on the plateau voltage, a timing circuit, a first converting unit, an enable circuit for providing an enable signal corresponding to a target valley number for a valley switching of the power switch, and a logic circuit. The timing circuit starts timing when the voltage detection signal is lowered to the first divided voltage and ends timing when the voltage detection signal is lowered to a zero-crossing threshold voltage. The first converting unit provides a control voltage corresponding to the time duration of the timing circuit. The logic circuit turns on the power switch based on the control voltage and the enable signal.

20 Claims, 10 Drawing Sheets

CONTROLLER AND CONTROLLING METHOD FOR QUASI-RESONANT CONTROLLED SWITCHING CONVERTER

CROSS-REFERENCE TO RELATED APPLICATIONS

This application claims priority to and the benefit of Chinese Patent Application 202211429135.0, filed on Nov. 15, 2022, which is incorporated herein by reference in its entirety.

TECHNICAL FIELD

The present invention relates to an electric circuit. More particularly, the present invention relates to a controller and a controlling method for a quasi-resonant controlled switching converter.

BACKGROUND OF THE INVENTION

Quasi-resonant flyback converters are extensively used in low power applications. In the quasi-resonant control, a flyback converter operates in a boundary condition mode (BCM). When a current passing through an energy storage component of the flyback converter lowers to zero, the parasitic capacitance of the energy storage component and the power switch starts to resonate. The power switch (e.g., a primary switch of the flyback converter) is turned on when the resonant voltage across the power switch has the minimum voltage level (i.e., valley switching), in order to reduce the switching loss of the flyback converter.

FIG. 1 is a circuit diagram of a quasi-resonant flyback converter 100. As shown in FIG. 1, the quasi-resonant flyback converter 100 includes a transformer T, a power switch MP that is coupled to a primary winding of the transformer T, a diode DO, an output capacitor Co, and a controller. The controller has a zero-current detection (ZCD) pin, a current sense pin CS, a power switch driving pin DRV, a zero-crossing comparison circuit 101, a delay circuit 102, a current comparison circuit 103, and a logic circuit 104.

FIG. 2 is an operation waveform diagram of the flyback converter 100 as shown in FIG. 1. As shown in FIGS. 1 and 2, the zero-crossing comparison circuit 101 is configured to detect whether the voltage $V_{DS}$ across the power switch MP crosses zero. After the zero-crossing comparison circuit 101 detects a zero-crossing point of the voltage $V_{DS}$, for example, at the time point t1 as shown in FIG. 2, the delay circuit 102 is configured to add a fixed delay time $T_{QR\_Delay}$ (e.g., 200 ns) after the time point t1. Or, a capacitor (e.g., a capacitor Ca as shown in FIG. 1) is added and coupled to the ZCD pin to delay the sampling of the zero-crossing point. Accordingly, an ON control signal S_on with a fixed delay is output to control the valley switching of the power switch MP. The current comparison circuit 103 is configured to compare a current sense signal that indicates the current passing through the power switch MP with a first threshold voltage and to generate an OFF control signal S_off in order to turn off the power switch MP. The logic circuit 104 is configured to generate a control signal to turn on or off the power switch MP based on the ON control signal S_on and the OFF control signal S_off.

The valley switching using a fixed delay time as discussed in FIGS. 1 and 2 is feasible when flyback converter products are at the early development stage. However, at the mass production stage, because of the distribution of the inductance of the transformers (approximately 3%) and the distribution of the parasitic capacitance of the power switches and the diodes DO (approximately 1%), the products will resonate with a wide range of resonant periods after demagnetization. If the valley switching using a fixed delay time is adopted, the power switches in some products may not be turned on at the valley effectively. Therefore, the quasi-resonant control fails, the efficiency is impeded, and the products have a high defect rate.

SUMMARY OF THE INVENTION

According to an embodiment of the present invention, a controller for a quasi-resonant controlled switching converter is provided. The quasi-resonant controlled switching converter has an energy storage component and a power switch that is coupled to the energy storage component. The controller includes a sample-and-hold circuit, a first voltage-dividing circuit, a timing circuit, a first converting unit, an enable circuit, a second converting unit, and a logic circuit. The sample-and-hold circuit is coupled to a detection circuit to receive a voltage detection signal that represents a voltage across the power switch. The sample-and-hold circuit is configured to provide a plateau voltage when a sample-and-hold signal is enabled, and the plateau voltage represents a maximum value of the voltage detection signal. The first voltage-dividing circuit is coupled to the sample-and-hold circuit to receive the plateau voltage and is configured to provide a first divided voltage based on the plateau voltage. The timing circuit is configured to provide a time detection signal at its output terminal. The timing circuit is configured to start timing at a first time point when the voltage detection signal is lowered to the first divided voltage and to end timing at a second time point when the voltage detection signal is lowered to a zero-crossing threshold voltage. A time duration between the first time point and the second time point is equal to a pulse width of the time detection signal. The first converting unit is configured to provide a control voltage in response to the time detection signal. The control voltage is proportional to the time duration. The enable circuit is configured to provide an enable signal that corresponds to a target valley number for a valley switching of the power switch. The second converting unit is configured to receive the enable signal and the control voltage and provide a delayed enable signal. The delayed enable signal has a first time delay relative to the enable signal, and the first time delay is proportional to the control voltage. The logic circuit is configured to receive the delayed enable signal and turn on the power switch based on the delayed enable signal.

According to an embodiment of the present invention, a controller for a quasi-resonant controlled switching converter is provided. The quasi-resonant controlled switching converter has an energy storage component and a power switch and an assist switch that are coupled to the energy storage component. The controller includes a sample-and-hold circuit, a first voltage-dividing circuit, a timing circuit, a first converting unit, an assist enable circuit, a second converting unit, a first logic circuit, and a second logic circuit. The sample-and-hold circuit is coupled to a detection circuit to receive a first voltage detection signal that represents a voltage across the power switch. The sample-and-hold circuit is configured to provide a plateau voltage when a sample-and-hold signal is enabled, and the plateau voltage represents a maximum value of the first voltage detection signal. The first voltage-dividing circuit is coupled to the sample-and-hold circuit to receive the plateau voltage and is configured to provide a first divided voltage based on the plateau voltage. The timing circuit is configured to provide a time detection signal at its output terminal. The timing circuit is configured to start timing at a first time point when the first voltage detection signal is lowered to the first divided voltage and to end timing at a second time point when the first voltage detection signal is lowered to a zero-crossing threshold voltage. A time duration between the first time point and the second time point is equal to a pulse width of the time detection signal. The first converting unit is configured to provide a control voltage in response to the time detection signal. The control voltage is proportional to the time duration. The assist enable circuit is configured to provide an assist enable signal that corresponds to a target valley number for a valley switching of the assist switch. The second converting unit is configured to receive the assist enable signal and the control voltage and provide a delayed enable signal. The delayed enable signal has a first time delay relative to the assist enable signal, and the first time delay is proportional to the control voltage. The first logic circuit is configured to receive the delayed enable signal and turn on the assist switch based on the delayed enable signal. The second logic circuit is configured to output a control signal to turn on the power switch.

According to an embodiment of the present invention, a control method for a quasi-resonant switching converter is provided. The quasi-resonant switching converter has an energy storage component and a power switch that is coupled to the energy storage component. The control method comprises: providing a voltage detection signal that represents a voltage across the power switch; providing a plateau voltage that represents a maximum value of the voltage detection signal when a sample-and-hold signal is enabled; dividing the plateau voltage to provide a first divided voltage; determining a first time point when the voltage detection signal is lowered to the first divided voltage; determining a second time point when the voltage detection signal is lowered to a zero-crossing threshold voltage; in response to a time duration between the first time point and the second time point, providing a control voltage that is proportional to the time duration; providing an enable signal that corresponds to a target valley number for a valley switching of the power switch; providing a delayed enable signal based on the enable signal and the control voltage, wherein the delayed enable signal has a first time delay relative to the enable signal, and the first time delay is proportional to the control voltage; and turning on the power switch based on the delayed enable signal.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

The use of the same reference label in different drawings indicates the same or like components.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

The phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
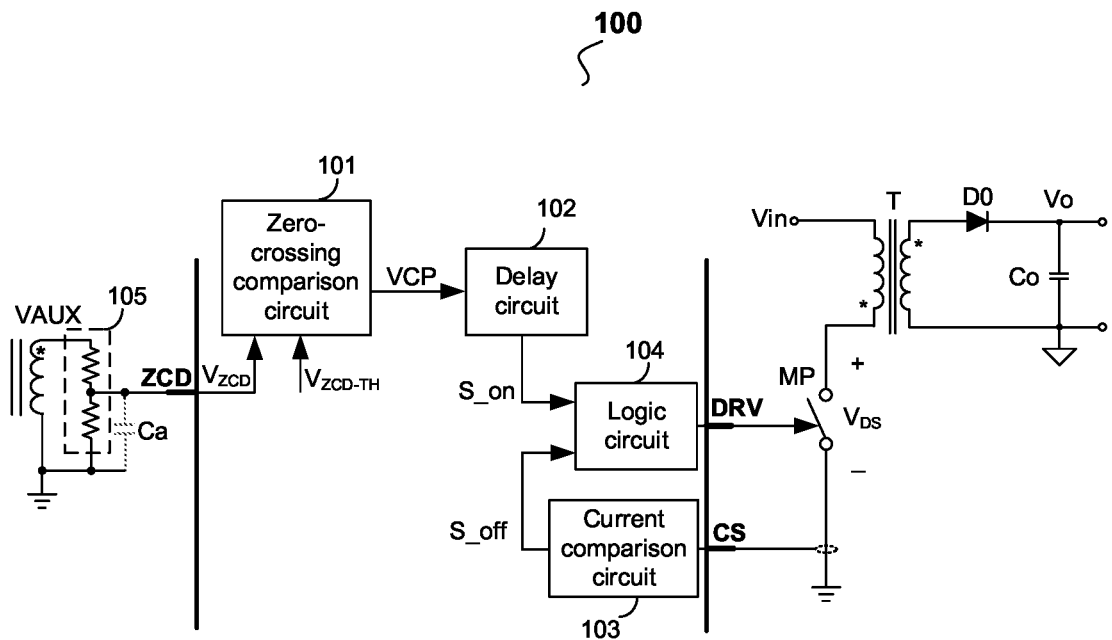
FIG. 1 is a circuit diagram of a quasi-resonant flyback converter.
Figure 2:
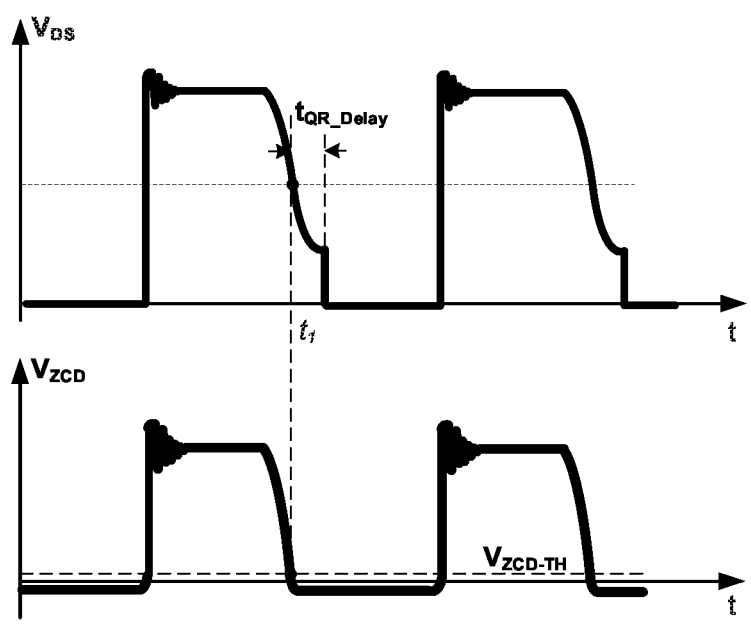
FIG. 2 is an operation waveform diagram of the flyback converter as shown in FIG. 1.
Figure 3:
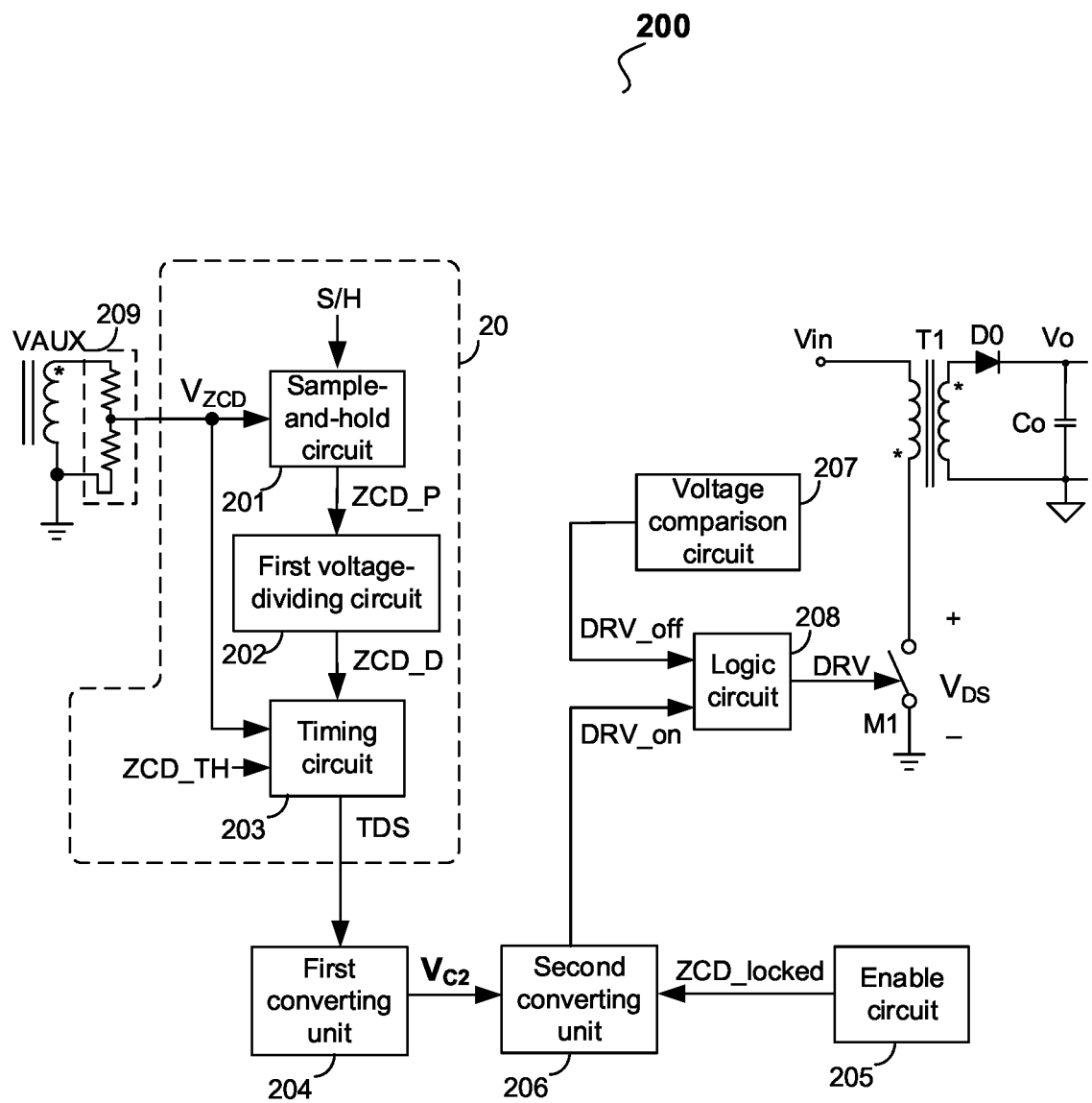
FIG. 3 is a circuit diagram of a quasi-resonant controlled switching converter in accordance with an embodiment of the present invention.

FIG. 3 is a circuit diagram of a quasi-resonant controlled switching converter 200 in accordance with an embodiment of the present invention. As shown in FIG. 3, the switching converter 200 includes a transformer T1, a power switch M1 that is coupled to a primary winding of the transformer T1, a diode DO, an output capacitor Co, and a controller. The controller includes a time sampling circuit 20, a first converting unit 204, an enable circuit 205, a second converting unit 205, a current comparison circuit 207, and a logic circuit 208.

In one embodiment, the switching converter 200 further includes a detection circuit 209. In the embodiment of FIG. 3, the detection circuit 209 is coupled to an auxiliary winding of the transformer T1 and is configured to generate a voltage detection signal $V_{ZCD}$ according to a voltage VAUX across the auxiliary winding. In one embodiment, the detection circuit 209 includes a resistor voltage-dividing circuit that is coupled to the auxiliary winding. In another embodiment, the detection circuit 209 is directly coupled to the power switch M1 and is configured to detect the voltage $V_{DS}$ across the power switch M1 to provide a voltage detection signal $V_{ZCD}$ that represents the voltage $V_{DS}$ across the power switch M1.

In the embodiment of FIG. 3, the time sampling circuit 20 is configured to sample a time duration TD1 between a first time point and a second time point. As shown in FIG. 3, the time sampling circuit 20 includes a sample-and-hold circuit 201, a first voltage-dividing circuit 202, and a timing circuit 203. The sample-and-hold circuit 201 has an input terminal and an output terminal, and its input terminal is coupled to the output terminal of the detection circuit 209 to receive the voltage detection signal $V_{ZCD}$. When the sample-and-hold signal S/H is enabled, the sample-and-hold circuit 201 is configured to provide a plateau voltage ZCD_P that represents the maximum voltage level of the voltage detection signal $V_{ZCD}$. In one embodiment, when the power switch M1 is turned off, after a blanking time $T_{blank}$, the sample-and-hold signal S/H is enabled.

The first voltage-dividing circuit 202 has an input terminal and an output terminal, and its input terminal is coupled to the output terminal of the sample-and-hold circuit 201 to receive the plateau voltage ZCD_P. The first voltage-dividing circuit 202 is configured to provide a first divided voltage ZCD_D at its output terminal based on the plateau voltage ZCD_P. In one embodiment, the first divided voltage ZCD_D is proportional to the plateau voltage ZCD_P. In one embodiment, the first divided voltage ZCD_D is equal to 0.9 times the plateau voltage ZCD_P. The timing circuit 203 is configured to provide a time detection signal TDS at its output terminal. The timing circuit 203 starts timing at the first time point when the voltage detection signal $V_{ZCD}$ is lowered to the first divided voltage ZCD_D and ends timing at the second time point when the voltage detection signal $V_{ZCD}$ is lowered to a zero-crossing threshold voltage ZCD_TH. The time duration TD1 between the first time point and the second time point is equal to the pulse width of the time detection signal TDS.

The first converting unit 204 has an input terminal and an output terminal, and its input terminal is configured to receive the time detection signal TDS. The first converting unit 204 is configured to provide a control voltage $V_{C2}$ that is proportional to the time duration TD1 in response to the time detection signal TDS. The enable circuit 205 is configured to provide an enable signal ZCD_locked based on the operation of the switching converter 200, and the enable signal ZCD_locked corresponds to the target valley number Valley_T that is used for the valley switching of the power switch M1. The second converting unit 206 has a first input terminal, a second input terminal, and an output terminal, it first input terminal is coupled to the output terminal of the first converting unit 204 to receive the control voltage $V_{C2}$, and its second input terminal is coupled to the enable circuit 205 to receive the enable signal ZCD_locked. The second converting unit 206 is configured to provide a delayed enable signal DRV_on at its output terminal based on the control voltage $V_{C2}$ and the enable signal ZCD_locked. The delayed enable signal DRV_on has a first time delay TD2 relative to the enable signal ZCD_locked, and the first time delay TD2 is proportional to the control voltage $V_{C2}$. In one embodiment, when the difference between the target valley number and the current valley number is reduced to 1 (that is, the current valley number is about to reach the target valley number), whether the voltage detection signal $V_{ZCD}$ is lowered to the zero-crossing threshold voltage ZCD_TH is determined. When the voltage detection signal $V_{ZCD}$ is detected to be lowered to the zero-crossing threshold voltage ZCD_TH, the enable signal ZCD_locked is enabled. The current comparison circuit 207 is configured to compare the voltage detection signal that indicates the current passing through the power switch M1 with a first threshold voltage to generate the OFF control signal DRV_off at its output terminal, in order to turn off the power switch M1. The logic circuit 208 is configured to generate the control signal DRV to turn on or off the power switch M1 based on the delayed enable signal DRV_on and the OFF control signal DRV_off.

In the embodiment of FIG. 3, the time duration TD1 between the first time point and the second time point is sampled in real time, and the time duration TD1 is converted to the control voltage $V_{C2}$ through the first converting unit 204. Then, when the enable signal ZCD_locked is enabled, the control voltage $V_{C2}$ is converted to the first time delay TD2 through the second converting unit 206. Accordingly, the actual, real-time valley switching of the power switch M1 is achieved.

Figure 4:
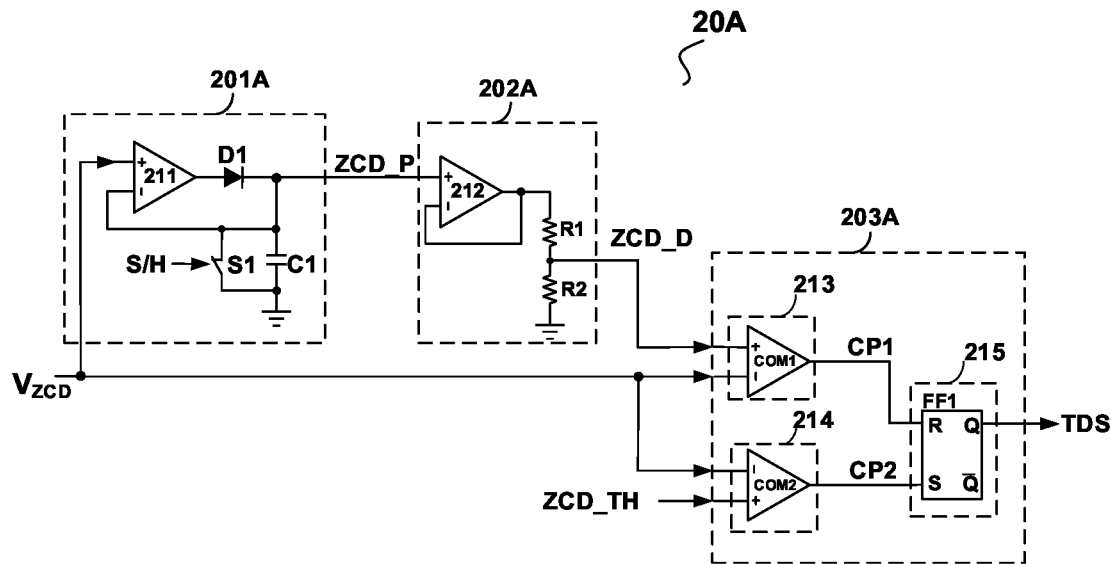
FIG. 4 is a circuit diagram of the time sampling circuit as shown in FIG. 3 in accordance with an embodiment of the present invention.

FIG. 4 is a circuit diagram of the time sampling circuit 20A as shown in FIG. 3 in accordance with an embodiment of the present invention. In the embodiment of FIG. 4, the time sampling circuit 20A includes a sample-and-hold circuit 201A, a first voltage-dividing circuit 202A, and a timing circuit 203A.

As shown in FIG. 4, the sample-and-hold circuit 201A is configured to sample and hold the maximum value of the voltage $V_{DS}$ across the power switch M1 during the time when the power switch M1 is turned off, and to provide the plateau voltage ZCD_P. In one embodiment, when the power switch M1 is turned off, after a blank time $T_{blank}$, the sample-and-hold signal S/H is enabled, and the voltage detection signal $V_{ZCD}$ is sampled and held for providing the plateau voltage ZCD_P. In the embodiment of FIG. 4, the sample-and-hold circuit 201A includes an operational amplifier 211, an unidirectional device D1, a capacitor C1, and a switch 51. The operational amplifier 211 has a non-inverting input terminal, an inverting input terminal, and an output terminal. Its non-inverting input terminal is coupled to the detection circuit 209 to receive the voltage detection signal $V_{ZCD}$, and its output terminal is coupled to the input terminal of the unidirectional device D1. The output terminal of the unidirectional device D1 is coupled to the first terminal of the capacitor C1. The second terminal of the capacitor C1 is coupled to the ground. The switch 51 and the capacitor C1 are coupled in parallel with each other, and the control terminal of the switch 51 is configured to receive the sample-and-hold signal S/H. The inverting input terminal of the operational amplifier 211 is coupled to the first terminal of the capacitor C1. When the sample-and-hold signal S/H is enabled, the switch 51 is turned off, and the operational amplifier 211 is configured to charge the capacitor C1 through the unidirectional device D1, in order to hold the value of the voltage detection signal $V_{ZCD}$ at the capacitor C1. When the power switch M1 is turned on, the switch 51 is turned on, and the voltage stored in the capacitor C1 is reset to zero. When the sample-and-hold signal S/H comes during the next period, the voltage detection signal $V_{ZCD}$ will be sampled and held again.

In one embodiment, the unidirectional device D1 includes a diode. In another embodiment, the unidirectional device D1 includes a transistor that has a base, a collector, and an emitter. The base and the collector of the transistor are coupled to the output terminal of the operational amplifier 211, and the emitter of the transistor is coupled to the first terminal of the capacitor C1.

The first voltage-dividing circuit 202A is coupled to the output terminal of the sample-and-hold circuit 201A to receive the plateau voltage ZCD_P and is configured to provide the first divided voltage ZCD_D based on the plateau voltage ZCD_P. In the embodiment of FIG. 4, the first voltage-dividing circuit 202A includes an operational amplifier 212 and a voltage-dividing circuit that includes resistors R1 and R2.

The timing circuit 203A includes a first time determination circuit 213, a second time determination circuit 214, and a timing logic circuit 215. The first time determination circuit 213 has a first input terminal, a second input terminal, and an output terminal. Its first input terminal is configured to receive the voltage detection signal $V_{ZCD}$, and its second input terminal is coupled to the first voltage-dividing circuit 202A to receive the first divided voltage ZCD_D in order to provide a first comparison signal CP1 at its output terminal. In one embodiment, the first time determination circuit 213 includes a comparator COM1. The non-inverting terminal of the comparator COM1 is configured to receive the first divided voltage ZCD_D, and the inverting terminal of the comparator COM1 is configured to receive the voltage detection signal $V_{ZCD}$. When the voltage detection signal $V_{ZCD}$ is lowered to the first divided voltage ZCD_D, the first comparison signal CP1 transitions from a low voltage level to a high voltage level to indicate the first time point.

The second time determination circuit 214 is configured to compare the voltage detection signal $V_{ZCD}$ and the zero-crossing threshold voltage ZCD_TH to provide a second comparison signal CP2 at its output terminal. In the embodiment of FIG. 4, the second time determination circuit 214 includes a comparator COM2. The inverting terminal of the comparator COM2 is configured to receive the voltage detection signal $V_{ZCD}$. The non-inverting terminal of the comparator COM2 is configured to receive the zero-crossing threshold voltage ZCD_TH. When the voltage detection signal $V_{ZCD}$ is lowered to the zero-crossing threshold voltage ZCD_TH, the second comparison signal CP2 transitions from a low voltage level to a high voltage level to indicate the second time point.

The timing logic circuit 215 includes a flip-flop FF1 that has a set terminal, a reset terminal, and an output terminal. Its reset terminal is configured to receive the first comparison signal CP1, its set terminal is configured to receive the second comparison signal CP2, and its output terminal is configured to provide the time detection signal TDS. In the embodiment of FIG. 4, the time duration TD1 between the first time point and the second time point is the time period when the time detection signal TDS remains at the low voltage level. In another embodiment, the time duration TD1 is the time period when the time detection signal TDS remains at the high voltage level.

Figure 5:
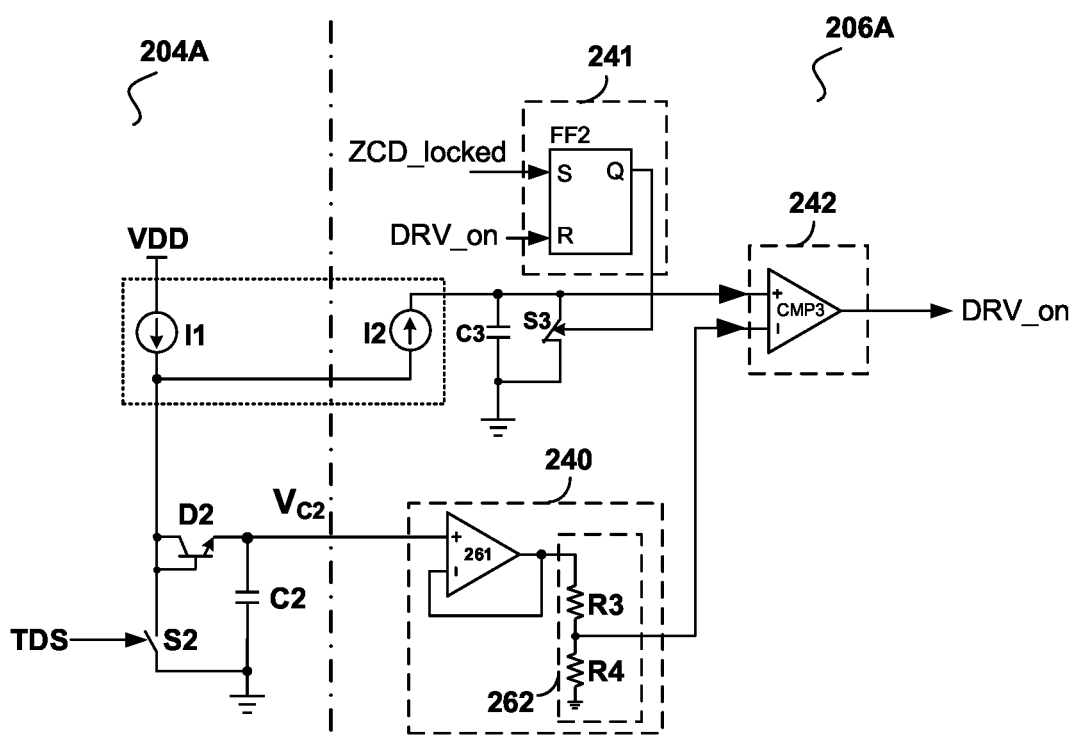
FIG. 5 is a circuit diagram of a first converting unit and a second converting unit in accordance with an embodiment of the present invention.

FIG. 5 is a circuit diagram of a first converting unit 204A and a second converting unit 206A in accordance with an embodiment of the present invention. In the embodiment of FIG. 5, the first converting unit 204A is a time-to-voltage converter. The first converting unit 204A includes a first current source I1, a capacitor C2, an unidirectional device D2, and a switch S2. As shown in FIG. 5, the first current source I1 has a power supply terminal that is coupled to a power supply voltage VDD and an output terminal that is configured to provide a first charging current. The capacitor C2 has a first terminal and a second terminal, and its second terminal is coupled to the ground. The unidirectional device D2 includes a transistor that has a base, a collector, and an emitter. The base and the collector of the transistor are coupled to the output terminal of the first current source I1, and the emitter of the transistor is coupled to the first terminal of the capacitor C2. The switch S2 has a first terminal, a second terminal, and a control terminal. Its first terminal is coupled to the output terminal of the first current source I1, its second terminal is coupled to the ground, and its control terminal is configured to receive the time detection signal TDS. When the time detection signal TDS is at the low voltage level, the switch S2 is in the off state, the unidirectional device D2 is in the on state, and the first current source I1 is configured to charge the capacitor C2 through the unidirectional device D2. That is, during the time duration TD1 between the first time point and the second time point, the first current source keeps charging the capacitor C2, to store the charge that indicates the time duration TD1 in the capacitor C2. When the time detection signal TDS is at the high voltage level, the switch S2 is turned on, the unidirectional device D2 is in the off state since its base is pulled down to the ground, and the first current source I1 stops charging the capacitor C2. The voltage $V_{C2}$ across the capacitor C2 is held as a control voltage. The control voltage $V_{C2}$ is proportional to the time duration TD1.

In the embodiment of FIG. 5, the second converting unit 206A is a voltage-to-time converter. The second converting unit 206A includes a second current source I2, a capacitor C3, a switch S3, a trigger circuit 241 and a comparison circuit 242. The second current source I2 is coupled to the first current source I1, so that the first current source I1 and the second current source I2 forms a current mirror. The second current source I2 is configured to provide a second charging current at its output terminal. In one embodiment, the first charging current and the second charging current are substantially equal to each other. In another embodiment, the second charging current are proportional to the first charging current. The capacitor C3 has a first terminal and a second terminal, its first terminal is coupled to the output terminal of the second current source I2, and its second terminal is coupled to the ground.

The trigger circuit 241 includes a flip-flop FF2 that has a set terminal, a reset terminal, and an output terminal. The set terminal is configure to receive the enable signal ZCD_locked, and the reset terminal is configured to receive the delayed enable signal DRV_on. The switch S3 has a first terminal, a second terminal, and a control terminal. Its first terminal is coupled to the first terminal of the capacitor C3, its second terminal is coupled to the ground, and its control terminal is coupled to the output terminal of the trigger circuit 241. The comparison circuit 242 has a first input terminal, a second input terminal, and an output terminal. Its first input terminal is coupled to the first terminal of the capacitor C3, and its second input terminal is coupled to the output terminal of the first converting unit 204A. The comparison circuit 242 is configured to provide the delayed enable signal DRV_on at its output terminal.

In a further embodiment, the second converting unit 206A further includes a second voltage-dividing circuit 240. The second voltage-dividing circuit 240 is configured to shorten the first time delay TD2 in order to compensate the propagation delay that the power switch M1 has when it turns on. The second voltage-dividing circuit 240 is coupled between the output terminal of the first converting unit 204A and the second input terminal of the comparison circuit 242. The second voltage-dividing circuit 240 includes a buffer circuit 261 and a resistor voltage-dividing circuit 262 that includes resistor R3 and R4. The buffer circuit 261 includes an operational amplifier to isolate the resistor voltage-dividing circuit 262 from the control voltage $V_{C2}$ to prevent the resistor voltage-dividing circuit 262 from affecting the control voltage $V_{C2}$. The resistor voltage-dividing circuit 262 is configured to provide a second divided voltage $k*V_{C2}$ at its output terminal based on the isolated control voltage $V_{C2}$. The comparison circuit 242 includes a comparator CMP3. The non-inverting terminal of the comparator CMP3 is coupled to the first terminal of the capacitor C3 to receive a voltage $V_{C3}$, and the inverting terminal of the comparator CMP3 is coupled to the output terminal of the second voltage-dividing circuit 240 to receive the second divided voltage $k*V_{C2}$. The comparator CMP3 is configured to provide the delayed enable signal DRV_on at its output terminal.

Figure 6:
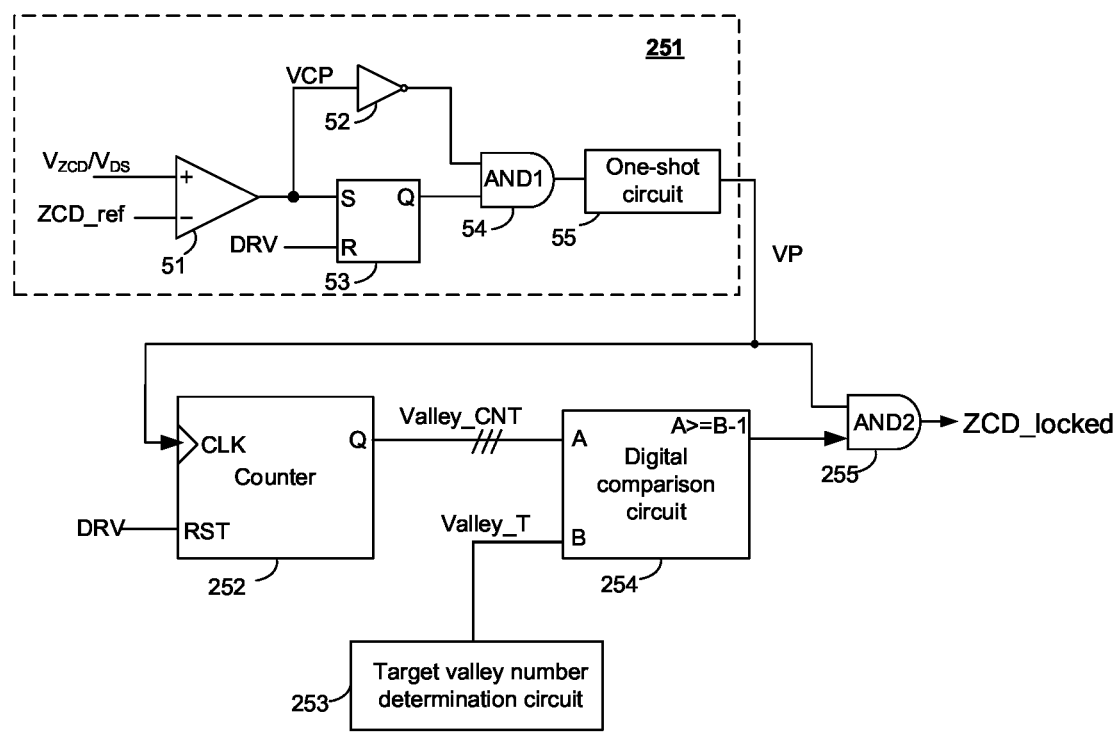
FIG. 6 is a circuit diagram of an enable circuit in accordance with an embodiment of the present invention.

FIG. 6 is a circuit diagram of the enable circuit 205A in accordance with an embodiment of the present invention. The enable circuit 205A includes a valley pulse generation circuit 251, a counter 252, and an AND gate circuit 255.

In the embodiment of FIG. 6, the valley pulse generation circuit 251 includes a valley bottom comparison circuit 51, an inverter 52, a RS flip-flop 53, an AND gate circuit 54, and a one-shot circuit 55. The valley bottom comparison circuit 51 has a non-inverting input terminal, an inverting input terminal, and an output terminal. Its non-inverting input terminal is configured to receive the voltage $V_{DS}$ across the power switch M1, and its inverting input terminal is configured to receive a valley reference signal ZCD_ref. The valley bottom comparison circuit 51 is configured to output a valley comparison signal VCP at its output terminal based on the voltage $V_{DS}$ and the valley reference signal ZCD_ref. In another embodiment, the valley bottom comparison circuit 51 may be replaced with the second time determination circuit 214 as shown in FIG. 4, and the second comparison signal CP2 may be used as the valley comparison signal VCP.

Still with reference to FIG. 6, the inverter 52 has an input terminal and an output terminal. Its input terminal is configured to receive the valley comparison signal VCP. The RS flip-fop 53 has a set terminal, a reset terminal, and an output terminal. Its set terminal is configured to receive the valley comparison signal VCP, and its reset terminal is configured to receive the control signal DRV of the power switch M1. The AND gate circuit 54 has a first input terminal, a second input terminal, and an output terminal. Its first input terminal is coupled to the output terminal of the inverter 52, and its second input terminal is coupled to the output terminal of the RS flip-flop 53. The one-shot circuit 55 has an input terminal and an output terminal. Its input terminal is coupled to the output terminal of the AND gate circuit 54. The one-shot circuit 55 is configured to provide a valley pulse signal VP at its output terminal. When the voltage $V_{DS}$ is greater than the valley reference signal ZCD_ref, the valley comparison signal VCP has a high voltage level, the AND gate circuit 54 outputs a low voltage level, and the one-shot circuit 55 does not operate or output any pulse signal. When the voltage $V_{DS}$ is less than the valley reference signal ZCD_ref, the valley comparison signal VCP transitions from the high voltage level to the low voltage level, the AND gate circuit 54 outputs the high voltage level, and the one-shot circuit 55 operates to output the one-shot valley pulse signal VP. When the control signal DRV comes, the RS flip-flop 53 is reset, the AND gate circuit 54 outputs the low voltage level, and the one-shot circuit 55 stops operating. The valley pulse generation circuit 251 is not limited to the embodiment as shown in FIG. 6. Any circuit that can detect the valley of a resonant waveform and output a pulse signal when the valley comes may be used as the valley pulse generation circuit.

The counter 252 has a clock terminal, a reset terminal, and an output terminal. Its clock terminal is coupled to the output terminal of the valley pulse generation circuit 251 to receive the valley pulse signal VP, and its reset terminal is configured to receive the control signal DRV. The counter 252 is configured to output a valley number Valley_CNT based on the valley pulse signal VP and the control signal DRV.

The target valley number determination circuit 253 is configured to provide a target valley number Valley_T for the current cycle. The digital comparison circuit 254 is configured to compare the current valley number Valley_CNT and the target valley number Valley_T. When the difference between the target valley number Valley_T and the current valley number Valley_CNT is reduced to 1 (that is, the current valley number Valley_CNT is about to reach the target valley number Valley_T), the digital comparison circuit 254 is configured to control the AND gate circuit 255 to output an enabled pulse signal (i.e., the enable signal ZCD_locked) when the next pulse of the valley pulse signal VP comes. When the output of the digital comparison circuit 254 maintains at the low voltage level, the AND gate circuit 255 is configured to shield and stop the valley pulse signal VP from being output as the enable signal ZCD_locked. When the output of the digital comparison circuit 254 transitions from the low voltage level to the high voltage level, the AND gate circuit 255 is configured to allow the valley pulse signal VP to be effectively transmitted to its output terminal, in order to provide the enable signal ZCD_locked.

Figure 7:
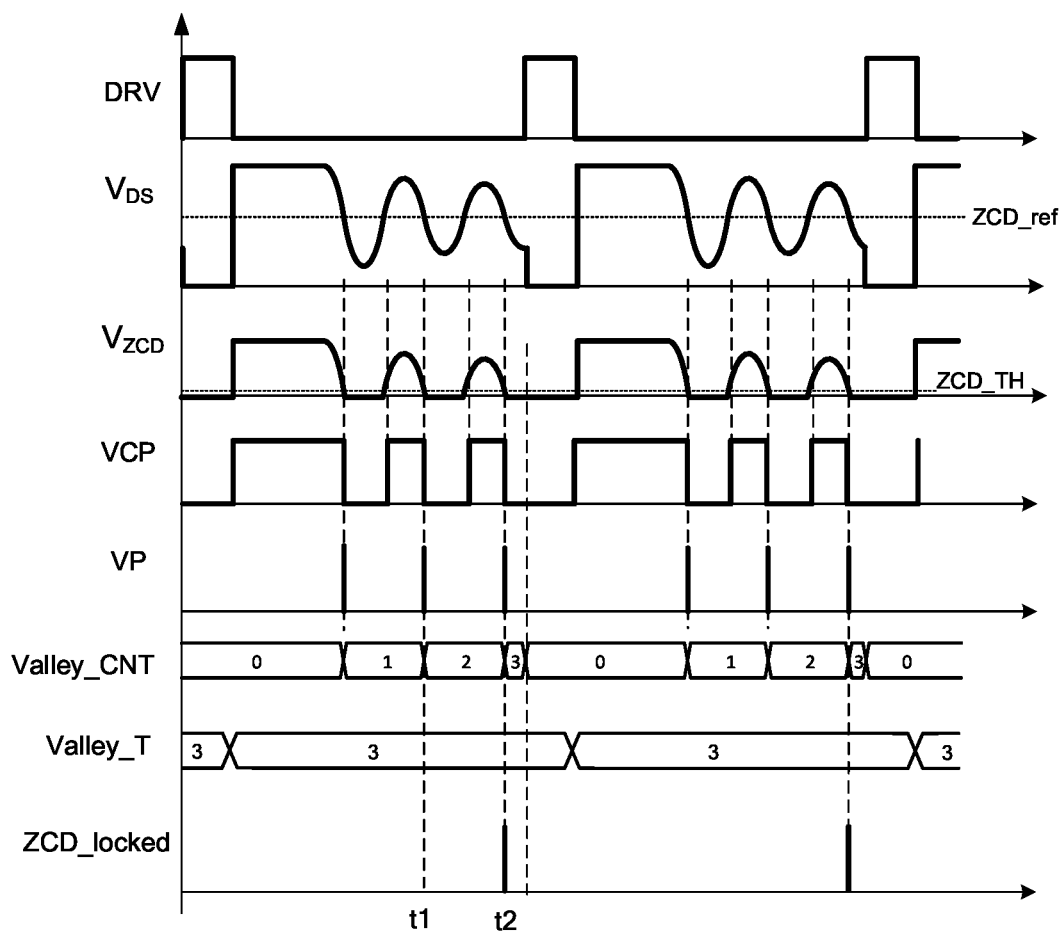
FIG. 7 is an operation waveform diagram of the enable circuit as shown in FIG. 6 in accordance with an embodiment of the present invention.

FIG. 7 is an operation waveform diagram of the enable circuit 205A as shown in FIG. 6 in accordance with an embodiment of the present invention. As shown in FIG. 7, the waveforms illustrated from top to bottom are the waveforms of the control signal DRV, the voltage $V_{DS}$ across the power switch M1, the voltage detection signal $V_{ZCD}$, the valley comparison signal VCP, the valley pulse signal VP, the valley number signal Valley_CNT, the target valley number Valley_T, and the enable signal ZCD_locked. In the embodiment of FIG. 7, the target valley number Valley_T is locked at the third valley. Before the time t1, the valley pulse signal VP is shielded by the AND gate circuit 255. At the time $t_1$, the current valley number Valley_CNT is updated to 2, the difference between the current valley number Valley_CNT and the target valley number Valley_T is reduced to 1, and the output of the digital comparison circuit 254 transitions from the low voltage level to the high voltage level. Then, at the time $t_3$, the pulse signal of the valley pulse signal VP comes, and the enable signal ZCD_locked is enabled.

Figure 8:
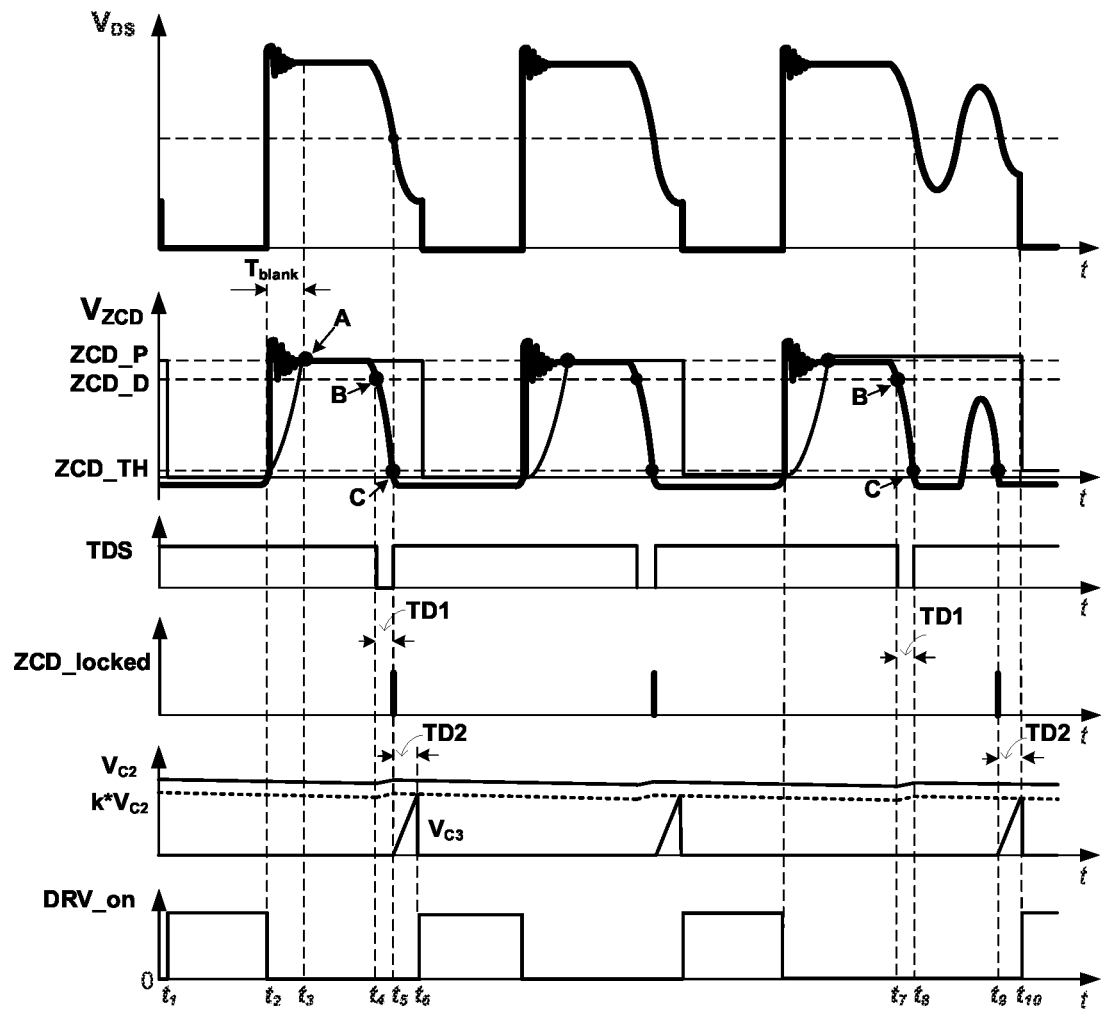
FIG. 8 is an operation waveform diagram of the switching converter as shown in FIG. 3 in accordance with an embodiment of the present invention.

FIG. 8 is an operation waveform diagram of the switching converter 200 as shown in FIG. 3 in accordance with an embodiment of the present invention. As shown in FIG. 8, at the time $t_1$, the power switch M1 is turned on. At the time $t_2$, the power switch M1 is turned off. After the blank time $T_{blank}$, at the time $t_3$, the sample-and-hold circuit 201A is configured to sample and hold the voltage detection signal $V_{ZCD}$ (as shown by a point A in FIG. 8), in order to provide the plateau voltage ZCD_P. At the time $t_4$, the voltage detection signal $V_{ZCD}$ is lowered to the first divided voltage ZCD_D, and the first time point is determined accordingly (as shown by a point B in FIG. 8). The first current source I1 starts to charge the capacitor C2, and the control voltage $V_{C2}$ starts to increase.

At the time $t_5$, the voltage detection signal $V_{ZCD}$ is lowered to the zero-crossing threshold voltage ZCD_TH, and the second time point is determined to be a point C as shown in FIG. 8. The first current source I1 stops charging the capacitor C2, and the control voltage $V_{C2}$ is held. The time duration TD1 between the first time point and the second time point is shown in FIG. 8. At the meantime, the enable signal ZCD_locked is enabled, the second current source I2 starts to charge the capacitor C3, and the voltage $V_{C3}$ across the capacitor C3 starts to increase. At the time $t_6$, when the voltage $V_{C3}$ across the capacitor C3 increases to $k*V_{C2}$, the delayed enable signal DRV_on is enabled, and the power switch M1 is turned on. The current cycle ends, and the switching converter 200 starts to enter the next cycle. As shown in FIG. 8, there is the first time delay TD2 between the time when the enable signal ZCD_locked is enabled and the time when the power switch M1 is actually turned on.

Still with reference to FIG. 8, the time duration TD1 between the first time point $t_7$ and the second time point to is sampled, and the control voltage $V_{C2}$ that is proportional to the time duration TD1 is provided. Then, at the time $t_9$, when the enable signal ZCD_locked is enabled, the first time delay TD2 that is proportional to the control voltage $V_{C2}$ is provided. When the first time delay TD2 passes, at the time $t_{10}$, the power switch M1 is turned on.

Figure 9:
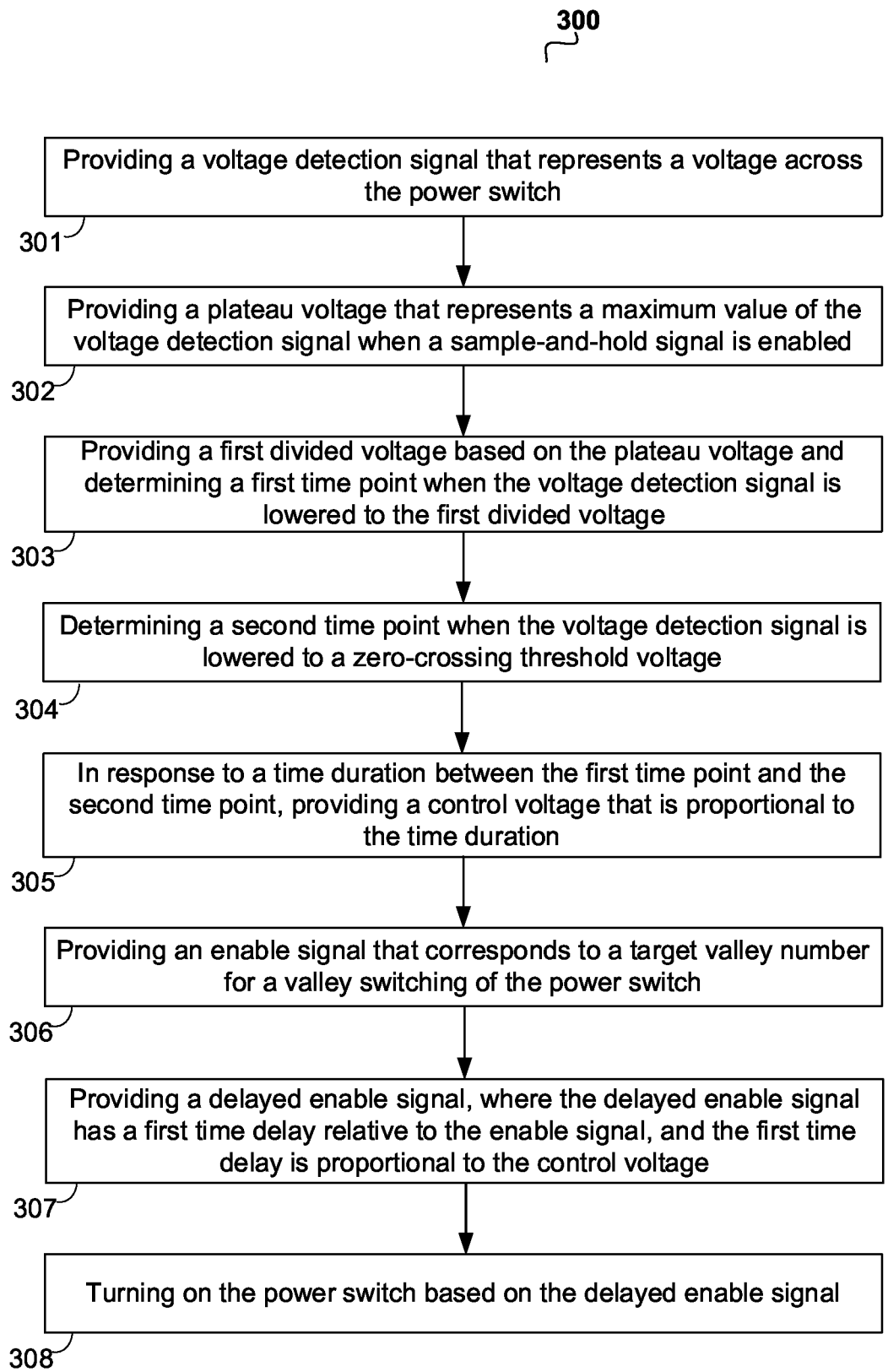
FIG. 9 is a flowchart of a control method fora quasi-resonant switching converter in accordance with an embodiment of the present invention.

FIG. 9 is a flowchart of a control method 300 for a quasi-resonant switching converter in accordance with an embodiment of the present invention. The switching converter includes an energy storage component and a power switch that is coupled to the energy storage component. The control method 300 includes steps 301-308. At the step 301, a voltage detection signal that represents a voltage across the power switch is provided. At the step 302, a plateau voltage that represents the maximum value of the voltage detection signal is provided when a sample-and-hold signal is enabled. At the step 303, a first divided voltage is provided based on the plateau voltage, and the first time point when the voltage detection signal is lowered to the first divided voltage is determined. At the step 304, the second time point when the voltage detection signal is lowered to the zero-crossing threshold voltage is determined. At the step 305, in response to a time duration between the first time point and the second time point, a control voltage that is proportional to the time duration is provided. At the step 306, an enable signal that corresponds to a target valley number for the valley switching of the power switch is provided. At the step 307, a delayed enable signal is provided based on the enable signal and the control voltage. The delayed enable signal has a first time delay relative to the enable signal, and the first time delay is proportional to the control voltage. At the step 308, the power switch is turned on based on the delayed enable signal.

In one embodiment, providing the control voltage includes charging a first capacitor with a first charging current during the time duration. In a further embodiment, providing the delayed enable signal includes: dividing the control voltage to provide a second divided voltage; charging the second capacitor with the second charging current when the enable signal is enabled, where the second charging current is proportional to the first charging current; comparing the voltage across the second capacitor and the second divided voltage and providing the delayed enable signal according to the comparison result; and resetting the voltage across the second capacitor to zero when the power switch is turned on.

Figure 10:
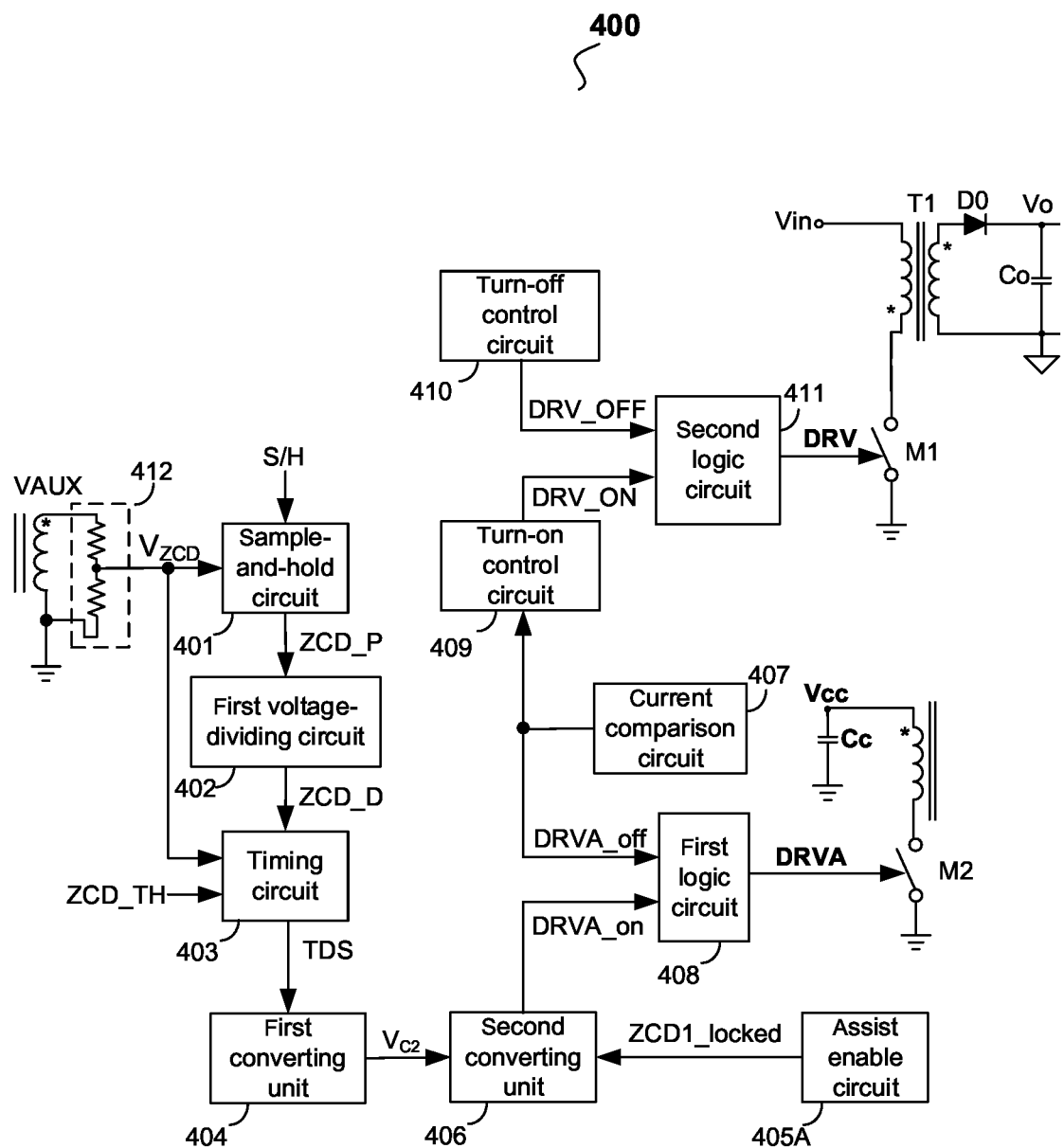
FIG. 10 is a circuit diagram of a quasi-resonant zero-voltage-controlled switching converter in accordance with an embodiment of the present invention.

FIG. 10 is a circuit diagram of a quasi-resonant zero-voltage-controlled switching converter 400 in accordance with an embodiment of the present invention. As shown in FIG. 10, the switching converter 400 includes a transformer T1, a power switch M1 and an assist switch M2 that are coupled to a primary winding of the transformer T1, a diode DO, an output capacitor Co, and a controller. The controller includes a sample-and-hold circuit 401, a first voltage-dividing circuit 402, a timing circuit 403, a first converting unit 404, an assist enable circuit 405A, a second converting unit 406, a current comparison circuit 407, a first logic circuit 408, a turn-on control circuit 409, a turn-off control circuit 410, and a second logic circuit 411.

In one embodiment, the switching converter 400 further includes a detection circuit 412. In the embodiment of FIG. 10, the detection circuit 412 is coupled to an auxiliary winding of the transformer T1 and is configured to generate a voltage detection signal $V_{ZCD}$ according to a voltage VAUX across the auxiliary winding. The voltage detection signal $V_{ZCD}$ represents the voltage $V_{DS}$ across the power switch M1.

The sample-and-hold circuit 401 has an input terminal and an output terminal, and its input terminal is coupled to the output terminal of the detection circuit 412 to receive the voltage detection signal $V_{ZCD}$. When the sample-and-hold signal S/H is enabled, the sample-and-hold circuit 401 is configured to provide a plateau voltage ZCD_P that represents the maximum voltage level of the voltage detection signal $V_{ZCD}$.

The first voltage-dividing circuit 402 has an input terminal and an output terminal, and its input terminal is coupled to the output terminal of the sample-and-hold circuit 401 to receive the plateau voltage ZCD_P. The first voltage-dividing circuit 402 is configured to provide a first divided voltage ZCD_D at its output terminal based on the plateau voltage ZCD_P. The timing circuit 403 is configured to provide a time detection signal TDS at its output terminal. The timing circuit 403 starts timing at the first time point when the voltage detection signal $V_{ZCD}$ is lowered to the first divided voltage ZCD_D and ends timing at the second time point when the voltage detection signal $V_{ZCD}$ is lowered to a zero-crossing threshold voltage ZCD_TH. The time duration TD1 between the first time point and the second time point is equal to the pulse width of the time detection signal TDS.

The first converting unit 404 has an input terminal and an output terminal, and its input terminal is configured to receive the time detection signal TDS. The first converting unit 404 is configured to provide a control voltage $V_{C2}$ that is proportional to the time duration TD1 in response to the time detection signal TDS. The assist enable circuit 405A is configured to provide an assist enable signal ZCD1_locked based on the operation of the switching converter 400, and the assist enable signal ZCD1_locked corresponds to the target valley number Valley_T that is used for the valley switching of the assist switch M2. The second converting unit 406 has a first input terminal, a second input terminal, and an output terminal, its first input terminal is coupled to the output terminal of the first converting unit 404 to receive the control voltage $V_{C2}$, and its second input terminal is coupled to the assist enable circuit 405A to receive the assist enable signal ZCD1_locked. The second converting unit 406 is configured to provide a delayed enable signal DRVA_on at its output terminal based on the control voltage $V_{C2}$ and the assist enable signal ZCD1_locked, in order to turn on the assist switch M2. The delayed enable signal DRVA_on has a first time delay TD2 relative to the assist enable signal ZCD1_locked, and the first time delay TD2 is proportional to the control voltage $V_{C2}$. In one embodiment, when the difference between the target valley number and the current valley number is reduced to 1 (that is, the current valley number is about to reach the target valley number), whether the voltage detection signal $V_{ZCD}$ is lowered to the zero-crossing threshold voltage ZCD_TH is determined. When the voltage detection signal $V_{ZCD}$ is detected to be lowered to the zero-crossing threshold voltage ZCD_TH, the assist enable signal ZCD1_locked is enabled. The current comparison circuit 407 is configured to compare the voltage detection signal that represents the current passing through the assist switch M2 with a second threshold voltage to generate the OFF control signal DRVA_off at its output terminal, in order to turn off the assist switch M2. The first logic circuit 408 is configured to generate the control signal DRVA to turn on or off the assist switch M2 based on the delayed enable signal DRVA_on and the OFF control signal DRVA_off. The turn-on control circuit 409 is configured to receive the OFF control signal DRVA_off and, when the assist switch M2 is detected to be turned off, provide the ON control signal DRV_ON to the second logic circuit 411 to turn on the power switch M1. The turn-off control circuit 410 is configured to provide the OFF control signal DRV_OFF to the second logic circuit 411 to turn off the power switch M1.

In the embodiment of FIG. 10, the switching converter 400 adopts quasi-resonant zero-voltage control. The time duration TD1 between the first time point and the second time point is sampled in real time, and the time duration TD1 is converted to the control voltage $V_{C2}$ through the first converting unit 404. Then, when the assist enable signal ZCD1_locked is enabled, the control voltage $V_{C2}$ is converted to the first time delay TD2 through the second converting unit 406, in order to implement the valley switching of the assist switch M2. After the assist switch M2 is turned off, when the voltage $V_{DS}$ across the power switch M1 is lowered to its minimum, the power switch M1 turns on to implement zero-voltage switching (ZVS). The present invention effectively solves the problem that the products in mass production may have varied parameters and achieve actual real-time valley switching and zero-voltage switching.

In some embodiments, the first converting unit 404 has a configuration similar to the one of the first converting unit 204A as shown in FIG. 5 and includes the capacitor C2, and the second converting unit 406 has a configuration similar to the one of the second converting unit 206A as shown in FIG. 5 and includes the capacitor C3.

Figure 11:
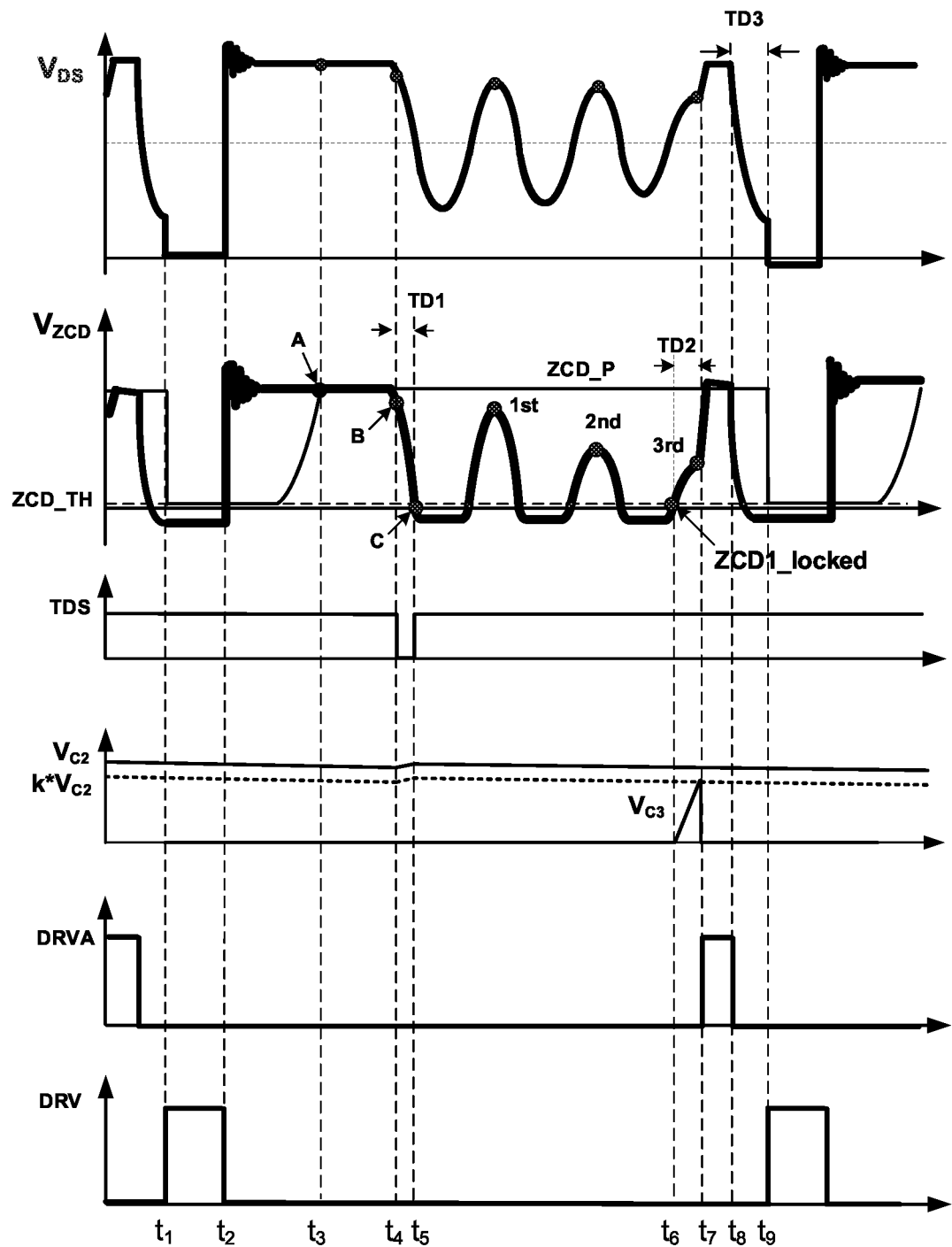
FIG. 11 is an operation waveform diagram of the switching converter as shown in FIG. 10 in accordance with an embodiment of the present invention.

FIG. 11 is an operation waveform diagram of the switching converter 400 as shown in FIG. 10 in accordance with an embodiment of the present invention. As shown in FIG. 11, at the time $t_1$, a cycle starts, and the power switch M1 is turned on. At the time $t_2$, the power switch M1 is turned off. At the time $t_3$, the sample-and-hold circuit 401 is configured to sample and hold the maximum value of the voltage detection signal $V_{ZCD}$, in order to provide the plateau voltage ZCD_P. At the time $t_4$, the first time point is determined (as shown by a point B in FIG. 8). Starting from the time $t_4$, the capacitor C2 of the first converting unit 404 starts to be charged. At the time $t_5$, the second time point is determined, and the capacitor C2 stops being charged. The charge associated with the time duration TD1 is stored in the capacitor C2. At the time $t_6$, the assist delayed enable signal ZCD1_locked is enabled, and the capacitor C3 of the second converting unit 406 starts to be charged. At the time $t_7$, when the voltage $V_{C3}$ across the capacitor C3 reaches the second divided voltage k*$V_{C2}$, the assist switch M2 is turned on through valley switching. At the time $t_8$, the assist switch M2 is turned off. After the assist switch M2 is turned off, when the voltage VDS across the power switch M1 reaches its minimum value (i.e., at the time $t_9$), the power switch M1 is turned on through zero-voltage switching. Then, the cycle ends, and a new cycle starts. As shown in FIG. 11, the zero-voltage switching of the power switch M1 has a second time delay TD3 relative to the time when the assist switch M2 is turned off.

Figure 12:
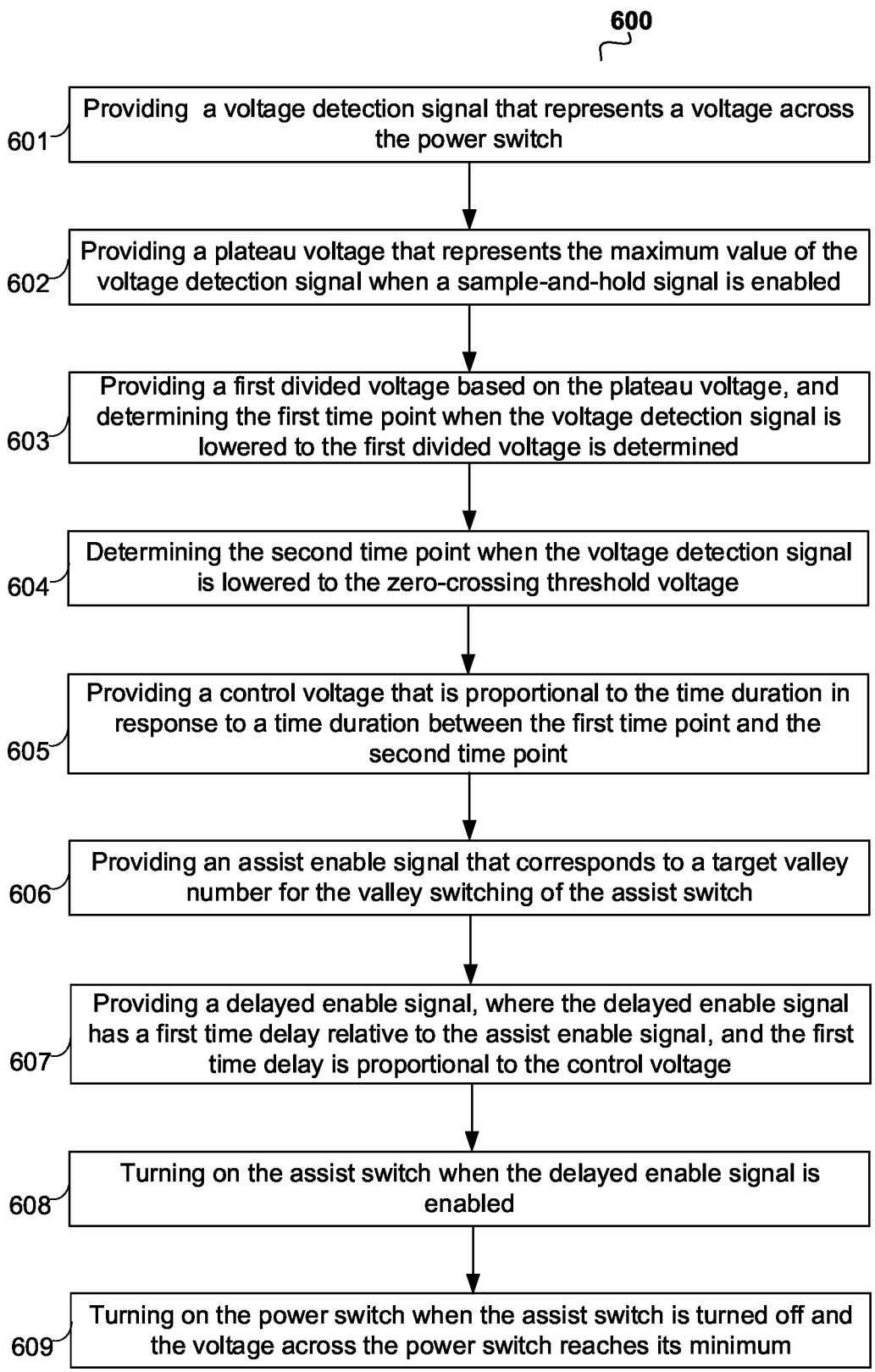
FIG. 12 is a flowchart of a control method for a quasi-resonant switching converter in accordance with an embodiment of the present invention.

FIG. 12 is a flowchart of a control method 600 for a quasi-resonant switching converter in accordance with an embodiment of the present invention. The switching converter includes an energy storage component and a power switch and an assist switch that are coupled to the energy storage component. The control method 600 includes steps 601-609. At the step 601, a voltage detection signal that represents a voltage across the power switch is provided. At the step 602, a plateau voltage that represents the maximum value of the voltage detection signal is provided when a sample-and-hold signal is enabled. At the step 603, the plateau voltage is divided to provide a first divided voltage, and the first time point when the voltage detection signal is lowered to the first divided voltage is determined. At the step 604, the second time point when the voltage detection signal is lowered to the zero-crossing threshold voltage is determined. At the step 605, in response to a time duration between the first time point and the second time point, a control voltage that is proportional to the time duration is provided. At the step 606, an assist enable signal that corresponds to a target valley number for the valley switching of the assist switch is provided. At the step 607, a delayed enable signal is provided based on the assist enable signal and the control voltage. The delayed enable signal has a first time delay relative to the assist enable signal, and the first time delay is proportional to the control voltage. At the step 608, the assist switch is turned on based on the delayed enable signal. At the step 609, when the assist switch is turned off and the voltage across the power switch reaches its minimum, the power switch is turned on.

Note that in the flowcharts described above, the steps in different boxes may also be implemented with orders different than the ones as shown in FIGS. 9 and 12. For example, the steps in two successive boxes may be executed at the same time, or may be executed in a reverse order.

In the present invention, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While a flyback converter is used as an example for the switching converters described in previous embodiments, it should be understood by person having ordinary skills in the art that the switching converters in the embodiments may be other DC-to-DC converters that may operate in a quasi-resonant mode. The present invention is also applicable to other quasi-resonant controlled converters, whether isolated or non-isolated. In addition, the enable signal in the present invention may be a synchronous signal received from the secondary side through an isolation circuit.

While various embodiments have been described above to illustrate the present invention, it should be understood that they have been presented by way of example only, and not limitation. Rather, the scope of the present invention is defined by the following claims and includes combinations and sub-combinations of the various features described above, as well as variations and modifications thereof, which would occur to persons skilled in the art upon reading the foregoing description.

What is claimed is:

1. A controller for a quasi-resonant controlled switching converter, wherein the quasi-resonant controlled switching converter has an energy storage component and a power switch that is coupled to the energy storage component, and the controller comprising:
   a sample-and-hold circuit coupled to a detection circuit to receive a voltage detection signal that represents a voltage across the power switch, wherein the sample-and-hold circuit is configured to provide a plateau voltage when a sample-and-hold signal is enabled, and the plateau voltage represents a maximum value of the voltage detection signal;
   a first voltage-dividing circuit coupled to the sample-and-hold circuit to receive the plateau voltage and configured to provide a first divided voltage based on the plateau voltage;
   a timing circuit configured to provide a time detection signal at its output terminal, wherein the timing circuit is configured to start timing at a first time point when the voltage detection signal is lowered to the first divided voltage and to end timing at a second time point when the voltage detection signal is lowered to a zero-crossing threshold voltage, and a time duration between the first time point and the second time point is equal to a pulse width of the time detection signal;
   a first converting unit configured to provide a control voltage in response to the time detection signal, wherein the control voltage is proportional to the time duration;
   an enable circuit configured to provide an enable signal that corresponds to a target valley number for a valley switching of the power switch;
   a second converting unit configured to receive the enable signal and the control voltage and provide a delayed enable signal, wherein the delayed enable signal has a first time delay relative to the enable signal, and the first time delay is proportional to the control voltage; and
   a logic circuit configured to receive the delayed enable signal and turn on the power switch based on the delayed enable signal.

2. The controller of claim 1, wherein the timing circuit comprises:
   a first time determination circuit configured to compare the voltage detection signal and the first divided voltage and provide a first comparison signal at an output terminal of the first time determination circuit;
   a second time determination circuit configured to compare the voltage detection signal and the zero-crossing threshold voltage and provide a second comparison signal at an output terminal of the second time determination circuit; and
   a timing logic circuit having a first input terminal, a second input terminal, and an output terminal, wherein the first input terminal of the timing logic circuit is configured to receive the first comparison signal, the second input terminal of the timing logic circuit is configured to receive the second comparison signal, and the timing logic circuit is configured to provide the time detection signal at the output terminal of the timing logic circuit.

3. The controller of claim 1, wherein when the power switch is turned off, after a blanking time, the sample-and-hold signal is enabled.

4. The controller of claim 1, wherein the first converting unit comprises:
   a first current source having a power supply terminal that is coupled to a power supply, and an output terminal that is configured to provide a first charging current;
   a first capacitor having a first terminal and a second terminal that is coupled to a ground;
   a first transistor having a first terminal, a second terminal, and a control terminal, wherein the first terminal and the control terminal of the first transistor are coupled to the output terminal of the first current source, and the second terminal of the first transistor is coupled to the first terminal of the first capacitor; and
   a first switch having a first terminal, a second terminal, and a control terminal, wherein the first terminal of the first switch is coupled to the output terminal of the first current source, the second terminal of the first switch is coupled to the ground, and the control terminal of the first switch is configured to receive the time detection signal.

5. The controller of claim 4, wherein the second converting unit comprises:
   a second current source coupled to the first current source to form a current mirror with the first current source, wherein the second current source is configured to provide a second charging circuit at an output terminal of the second current source;
   a second capacitor having a first terminal and a second terminal, wherein the first terminal of the second capacitor is coupled to the output terminal of the second current source, and the second terminal of the second capacitor is coupled to the ground;
   a trigger circuit having a set terminal, a reset terminal, and an output terminal, wherein the set terminal of the trigger circuit is configured to receive the enable signal, and the reset terminal of the trigger circuit is configured to receive the delayed enable signal;
   a second switch having a first terminal, a second terminal, and a control terminal, wherein the first terminal of the second switch is coupled to the first terminal of the second capacitor, the second terminal of the second switch is coupled to the ground, and the control terminal of the second switch is coupled to the output terminal of the trigger circuit; and
   a comparison circuit having a first input terminal, a second input terminal, and an output terminal, wherein the first input terminal of the comparison circuit is coupled to the first terminal of the second capacitor, the second input terminal of the comparison circuit is coupled to an output terminal of the first converting unit, and the comparison circuit is configured to provide the delayed enable signal at the output terminal of the comparison circuit.

6. The controller of claim 5, wherein the second converting unit further comprises a second voltage-dividing circuit that is coupled between the output terminal of the first converting unit and the second terminal of the comparison circuit, and the second voltage-dividing circuit comprises:
   a buffer circuit having an input terminal and an output terminal, wherein the input terminal of the buffer circuit is coupled to the output terminal of the first converting unit to receive the control voltage; and
   a third voltage-dividing circuit configured to divide the control voltage to provide the second divided voltage to the second input terminal of the comparison circuit at the output terminal of the third voltage-dividing circuit.

7. The controller of claim 1, wherein when a difference between the target valley number and a current valley number is reduced to 1, and when the voltage detection signal is lowered to the zero-crossing threshold voltage, the enable signal is enabled.

8. A controller for a quasi-resonant controlled switching converter, wherein the quasi-resonant controlled switching converter has an energy storage component, a power switch, and an assist switch, the power switch and the assist switch are coupled to the energy storage component, and the controller comprising:
   a sample-and-hold circuit coupled to a detection circuit to receive a first voltage detection signal that represents a voltage across the power switch, wherein the sample-and-hold circuit is configured to provide a plateau voltage when a sample-and-hold signal is enabled, and the plateau voltage represents a maximum value of the first voltage detection signal;
   a first voltage-dividing circuit coupled to the sample-and-hold circuit to receive the plateau voltage and configured to provide a first divided voltage based on the plateau voltage;
   a timing circuit configured to provide a time detection signal at an output terminal of the timing circuit, wherein the timing circuit is configured to start timing at a first time point when the first voltage detection signal is lowered to the first divided voltage and to end timing at a second time point when the first voltage detection signal is lowered to a zero-crossing threshold voltage, and a time duration between the first time point and the second time point is equal to a pulse width of the time detection signal;
   a first converting unit configured to provide a control voltage in response to the time detection signal, wherein the control voltage is proportional to the time duration;
   an assist enable circuit configured to provide an assist enable signal that corresponds to a target valley number for a valley switching of the assist switch;
   a second converting unit configured to receive the assist enable signal and the control voltage and provide a delayed enable signal, wherein the delayed enable signal has a first time delay relative to the assist enable signal, and the first time delay is proportional to the control voltage; and
   a first logic circuit configured to receive the delayed enable signal and turn on the assist switch based on the delayed enable signal; and
   a second logic circuit configured to output a control signal to turn on the power switch after the assist switch is turned off.

9. The controller of claim 8, wherein the timing circuit comprises:
   a first time determination circuit configured to compare the first voltage detection signal and the first divided voltage and provide a first comparison signal at an output terminal of the first time determination circuit;
   a second time determination circuit configured to compare the first voltage detection signal and the zero-crossing threshold voltage and provide a second comparison signal at an output terminal of the second time determination circuit; and
   a timing logic circuit having a first input terminal, a second input terminal, and an output terminal, wherein the first input terminal of the timing logic circuit is configured to receive the first comparison signal, the second input terminal of the timing logic circuit is configured to receive the second comparison signal, and the timing logic circuit is configured to provide the time detection signal at the output terminal of the timing logic circuit.

10. The controller of claim 8, wherein the first converting unit comprises:
    a first current source having a power supply terminal that is coupled to a power supply and an output terminal that is configured to provide a first charging current;
    a first capacitor having a first terminal and a second terminal that is coupled to a ground;
    an unidirectional component having an input terminal and an output terminal, wherein the input terminal of the unidirectional component is coupled to the output terminal of the first current source, and the output terminal of the unidirectional component is coupled to the first terminal of the first capacitor; and
    a first switch having a first terminal, a second terminal, and a control terminal, wherein the first terminal of the first switch is coupled to the output terminal of the first current source, the second terminal of the first switch is coupled to the ground, and the control terminal of the first switch is configured to receive the time detection signal.

11. The controller of claim 10, wherein the second converting unit comprises:
    a second current source coupled to the first current source to form a current mirror with the first current source, wherein the second current source is configured to provide a second charging circuit at an output terminal of the second current source;
    a second capacitor having a first terminal and a second terminal, wherein the first terminal of the second capacitor is coupled to the output terminal of the second current source, and the second terminal of the second capacitor is coupled to the ground;
    a trigger circuit having a set terminal, a reset terminal, and an output terminal, wherein the set terminal of the trigger circuit is configured to receive the enable signal, and the reset terminal of the trigger circuit is configured to receive the delayed enable signal;
    a second switch having a first terminal, a second terminal, and a control terminal, wherein the first terminal of the second switch is coupled to the first terminal of the second capacitor, the second terminal of the second switch is coupled to the ground, and the control terminal of the second switch is coupled to the output terminal of the trigger circuit; and
    a comparison circuit having a first input terminal, a second input terminal, and an output terminal, wherein the first input terminal of the comparison circuit is coupled to the first terminal of the second capacitor, the second input terminal of the comparison circuit is coupled to an output terminal of the first converting unit, and the comparison circuit is configured to provide the delayed enable signal at the output terminal of the comparison circuit.

12. The controller of claim 11, wherein the second converting unit further comprises a second voltage-dividing circuit that is coupled between the output terminal of the first converting unit and the second terminal of the comparison circuit, and the second voltage-dividing circuit comprises:
a buffer circuit having an input terminal and an output terminal, wherein the input terminal of the buffer circuit is coupled to the output terminal of the first converting unit to receive the control voltage; and
a third voltage-dividing circuit configured to divide the control voltage to provide the second divided voltage to the second input terminal of the comparison circuit at the output terminal of the third voltage-dividing circuit.

13. The controller of claim 8, wherein when a difference between the target valley number and a current valley number is reduced to 1, and when the first voltage detection signal is lowered to the zero-crossing threshold voltage, the assist enable signal is enabled.

14. The controller of claim 8, wherein when the power switch is turned off, after a blanking time, the sample-and-hold signal is enabled.

15. The controller of claim 8, further comprising:
a current comparison circuit configured to compare a second voltage detection signal with a threshold voltage to generate an OFF control signal, wherein the second voltage detection signal represents a current passing through the assist switch, and the first logic circuit is further configured to receive the OFF control signal and turn off the assist switch based on the OFF control signal.

16. The controller of claim 15, further comprising:
a turn-on control circuit configured to receive the OFF control signal and, when the assist switch is detected to be turned off, provide an ON control signal to the second logic circuit in order to turn on the power switch.

17. The controller of claim 8, further comprising:
a turn-off control circuit configured to provide an OFF control signal to the second logic circuit in order to turn off the power switch.

18. A control method for a quasi-resonant switching converter, wherein the quasi-resonant switching converter has an energy storage component and a power switch that is coupled to the energy storage component, and the control method comprising:
providing a voltage detection signal that represents a voltage across the power switch;
providing a plateau voltage that represents a maximum value of the voltage detection signal when a sample-and-hold signal is enabled;
dividing the plateau voltage to provide a first divided voltage;
determining a first time point when the voltage detection signal is lowered to the first divided voltage;
determining a second time point when the voltage detection signal is lowered to a zero-crossing threshold voltage;
in response to a time duration between the first time point and the second time point, providing a control voltage that is proportional to the time duration;
providing an enable signal that corresponds to a target valley number for a valley switching of the power switch;
providing a delayed enable signal based on the enable signal and the control voltage, wherein the delayed enable signal has a first time delay relative to the enable signal, and the first time delay is proportional to the control voltage; and
turning on the power switch based on the delayed enable signal.

19. The control method of claim 18, wherein providing the control voltage comprises charging a first capacitor with a first charging current during the time duration.

20. The control method of claim 18, wherein providing the delayed enable signal comprises:
dividing the control voltage to provide a second divided voltage;
charging a second capacitor with a second charging current when the enable signal is enabled, wherein the second charging current is proportional to the first charging current; and
comparing a voltage across the second capacitor and the second divided voltage and providing the delayed enable signal according to the comparison result.

* * * * *